United States Patent
Sorrell et al.

(10) Patent No.: US 7,545,600 B2
(45) Date of Patent: Jun. 9, 2009

(54) SINGLE PIECE AIR DIVERTER FOR A DATA STORAGE DEVICE

(75) Inventors: Jason A. Sorrell, Denver, CO (US); Frederick P. Renken, Boulder, CO (US); Robert A. Alt, Longmont, CO (US); David R. Lapp, Boulder, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 12/165,957

(22) Filed: Jul. 1, 2008

(65) Prior Publication Data

US 2008/0266708 A1     Oct. 30, 2008

Related U.S. Application Data

(62) Division of application No. 10/460,930, filed on Jun. 13, 2003, now Pat. No. 7,405,902.

(51) Int. Cl.
*G11B 5/60* (2006.01)
(52) U.S. Cl. .................................... 360/97.02
(58) Field of Classification Search ............. 360/97.02, 360/256, 256.1, 256.2, 256.5
See application file for complete search history.

(56) References Cited

U.S. PATENT DOCUMENTS

| | | | |
|---|---|---|---|
| 4,538,193 A | 8/1985 | Dimmick et al. |
| 4,647,997 A | 3/1987 | Westwood |
| 4,692,829 A | 9/1987 | Campbell |
| 5,043,834 A | 8/1991 | Kubo et al. |
| 5,124,867 A | 6/1992 | Kitahori et al. |
| 5,212,679 A | 5/1993 | Tohkairin |
| 5,319,511 A | 6/1994 | Lin |
| 5,541,791 A | 7/1996 | Yamasaki et al. |
| 5,555,146 A | 9/1996 | Hickox et al. |
| 5,602,700 A | 2/1997 | Viskochil et al. |
| 5,668,683 A | 9/1997 | Stone |
| 5,768,057 A | 6/1998 | Fernandes et al. |
| 5,768,058 A | 6/1998 | Hofland |
| 5,793,572 A | 8/1998 | Lalouette et al. |
| 5,859,751 A | 1/1999 | Tacklind |
| 5,956,203 A | 9/1999 | Schirle et al. |
| 6,339,521 B1 | 1/2002 | Durrum et al. |
| 6,342,991 B1 | 1/2002 | Joshi et al. |
| 6,462,912 B1 | 10/2002 | Pasupathy et al. |
| 6,728,074 B2 | 4/2004 | Hanada et al. |
| 7,119,992 B2 | 10/2006 | Miyamoto et al. |

(Continued)

*Primary Examiner*—Angel A. Castro
(74) *Attorney, Agent, or Firm*—Shumaker & Sieffert, P.A.

(57) ABSTRACT

A method and combination for mitigating turbulent air flow across an actuator of a data storage device. The combination includes a base deck having a retention cam surface adjacent a mounting pin, and an air diverter having a mounting aperture and a spring portion with a cam follower. The air diverter is confined adjacent the base deck in an operating position by executing the steps of the method to form the combination.

The method includes the steps of; providing the base deck, disposing the air diverter onto the mounting pin, attaching a spindle motor with a disc to the base deck, securing an actuator supporting a read/write head to the base deck and affixing a top cover to the base deck, which places the air diverter under a compressive load between the top cover and the base deck thereby fixing the air diverter in the operating position.

7 Claims, 4 Drawing Sheets

U.S. PATENT DOCUMENTS

| | | |
|---|---|---|
| 7,379,265 B2 * | 5/2008 | Wang et al. .............. 360/97.02 |
| 2002/0015255 A1 | 2/2002 | Tadepalli et al. |
| 2002/0036862 A1 * | 3/2002 | Tsang et al. ............. 360/97.02 |
| 2002/0071202 A1 * | 6/2002 | Myokan et al. .......... 360/97.02 |
| 2002/0075603 A1 * | 6/2002 | Hanada et al. ........... 360/256.1 |
| 2002/0149876 A1 | 10/2002 | Sakata et al. |
| 2002/0196581 A1 | 12/2002 | Tsang et al. |
| 2003/0086208 A1 * | 5/2003 | Hong et al. .............. 360/256.1 |

* cited by examiner

US 7,545,600 B2

SINGLE PIECE AIR DIVERTER FOR A DATA STORAGE DEVICE

This application is a Divisional of U.S. patent application Ser. No. 10/460,930, filed Jun. 13, 2003, the entire contents of which are incorporated herein by reference.

FIELD OF THE INVENTION

The claimed invention relates to the field of data storage devices. More particularly, but not by way of limitation, this invention relates to a combination and method for controlling the aerodynamic excitation imparted to disc drive components by airstreams generated by spinning discs in a data storage device.

BACKGROUND

One key component of any computer system is a device, (such as a disc drive) to store data. The most basic parts of a disc drive are an information storage disc that is rotated, an actuator that moves a read/write head to various locations over the substantially concentric data tracks of a disc, and electrical circuitry used for encoding data so that the data can be successfully retrieved and written to the disc surface. A microprocessor controls most of the operations of the disc drive including passing requested data read by the transducer to the computer system and receiving data from the computer system for storage on the disc.

A problem associated with disc drives is resonance or vibrations at certain frequencies, which causes the read/write head to move off a designated data track. In other words, if there is even a slight vibration, the read/write head may move away from the center of the designated data track during a track following operation, causing data to be misread or a failure to properly write data. One source of vibration is airflow generated by the rotating discs, which excites head suspensions, which in turn cause the read/write head to vibrate. The vibration causes run-out, i.e., an off-track motion. Off-track motion becomes more acute as the density of tracks increases, because the suspensions and heads become less tolerant of vibration induced movement.

As such, challenges remain and a need persists for improvements in methods and apparatus to reduce vibrations in the suspension.

SUMMARY OF THE INVENTION

In accordance with preferred embodiments, a method and combination are provided for mitigating turbulent air flow across an actuator of a data storage device. The combination includes a base deck having a retention cam surface adjacent a mounting pin, and an air diverter having a mounting aperture and a spring portion with a cam follower. The cam follower is positioned in sliding contact with a cam surface of the base deck. The spring portion provides a retention force to assist in maintaining the air diverter in a predetermined location when the cam follower interacts with a lobe or detent of the cam surface. The air diverter is secured to the base deck in an operating position by executing steps of the method, which forms the combination.

The method includes the steps of; providing the base deck, disposing the air diverter onto the mounting pin, attaching a spindle motor with a disc to the base deck, securing an actuator supporting a read/write head to the base deck and securing a top cover to the base deck. Securing the top cover to the base deck places the air diverter under a compressive load between the top cover and the base deck thereby fixing the air diverter in a desired position.

These and various other features and advantages that characterize the claimed invention will be apparent upon reading the following detailed description and upon review of the associated drawings.

DETAILED DESCRIPTION

Figure 1:
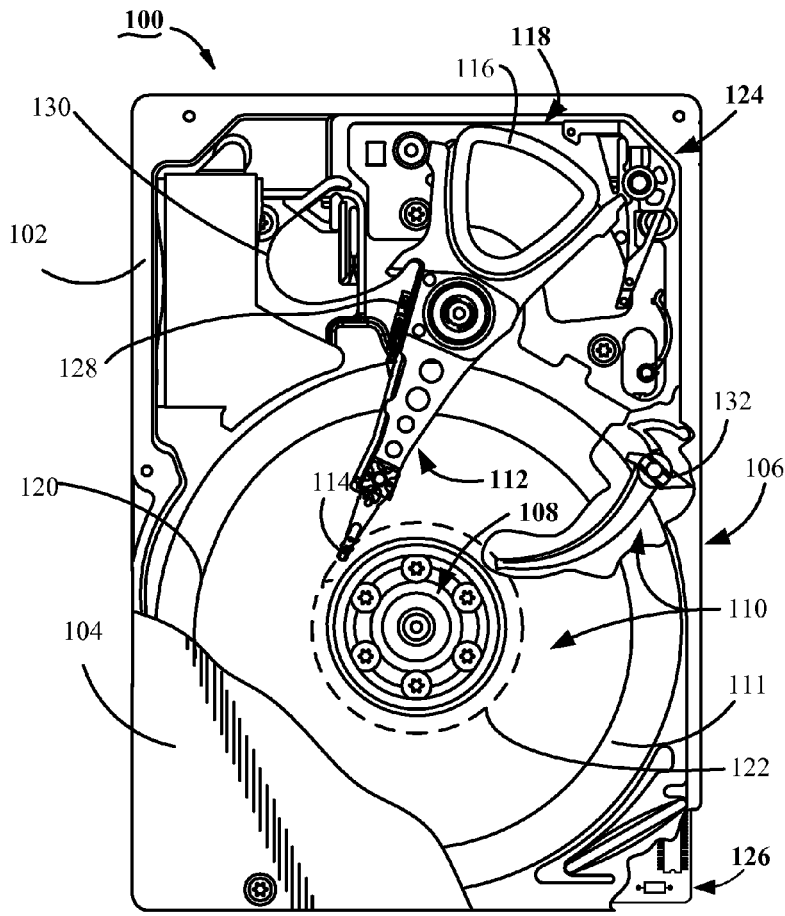
FIG. 1 is a partial cutaway top plan view of a data storage device (DSD) that incorporates an air diverter for mitigating turbulent air flow across an actuator of the DSD.

Referring now to the drawings, FIG. 1 provides a top plan view of a data storage device DSD 100. The DSD 100 includes a base deck 102 cooperating with a top cover 104 (shown in partial cutaway) to form a sealed housing for a mechanical portion of the DSD 100, referred to as a head-disc assembly 106.

A spindle motor assembly 108 (also referred to as motor 108) rotates a number of data storage discs 110 with a magnetic recording surface 111 at a substantially constant operational speed. Each disc 110 includes at least one magnetic recording surface 111. A rotary actuator (actuator) 112 supports and rotates a number of read/write heads (heads) 114 adjacent the magnetic recording surfaces 111 when current is applied to a coil 116 of a voice coil motor (VCM) 118.

During operation of the DSD 100, the actuator 112 moves the heads 114 to data tracks 120 on the surfaces 111 to write data to and read data from the discs 110. When the DSD 100 is deactivated, the actuator 112 positions the heads 114 adjacent a home position 122 and the actuator 112 is confined by latching a toggle latch 124.

Command, control and interface electronics for the DSD 100 are provided on a printed circuit board assembly 126 mounted to the head-disc assembly 106. During data transfer operations, a preamplifier/driver (preamp) 128 attached to a flex circuit 130 conditions read/write signals conducted by the flex circuit 130 between the printed circuit board assembly 126 and the heads 114.

During operation of the DSD 100, an air diverter 132, positioned between the discs 110, is located upstream of the heads 114 to mitigate turbulent air flow across the actuator 112. Turbulent air flow promotes off-track disturbances. By installing the air diverter 132 between the discs 110 and upstream from the actuator 112, a portion of the airflow developed between the rotating discs 110, which would have otherwise impacted the heads 114, is diverted from influencing the actuator 112 and directed along the base deck 102 towards the VCM 118. A reduction in the amount of air impacting the actuator 112, coupled with the reduction in turbulence present in the reduced air flow, results in a more stable environment for controlling the flight of the heads 114.

The air diverter 132 is installed prior to the discs 110 and actuator 112, and later rotated into either a shipping position or an operating position, as shown, after the discs 110 and actuator 112 are in place. Because the air diverter 132 is installed prior to the discs 110 and actuator 112, and later rotated into either the shipping position or the operating position, the air diverter 132 does not have to be removed for repair or replacement of either the discs 114 or the actuator 112, thereby providing a cost advantage during the manufacturing process.

Additional cost advantages of the present invention are a result of the unitary design of the air diverter 132 and the ability to install the air diverter 132 onto the base deck 102, absent the need of any additional attachment or hardware components. The unitary design and hardware fee installation means that multiple components need not be ordered, tracked and controlled through the manufacturing process, thereby avoiding overhead costs associated with production materials, which at times, can dwarf the purchase price of the component being controlled.

Figure 2:
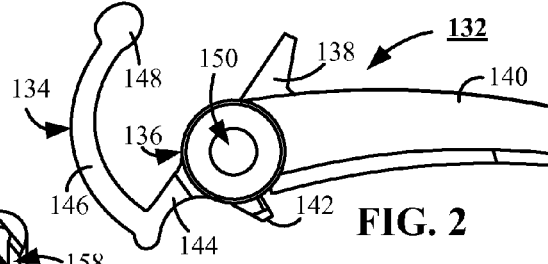
FIG. 2 is a bottom plan view of the air diverter of FIG. 1.

FIG. 2 shows a preferred embodiment of a bi-stable configuration of the air diverter 132, which includes a retention member 134 extending in a first direction from a main body 136 of the air diverter 132, a constraint member 138 extending in a second direction from the main body 136, an air diverter member 140 extending in a third direction from the main body 136, and a disc snubber member 142 extending in a fourth direction from the main body 136. The retention member 134 includes a base portion 144 adjacent the main body 136 and a spring portion 146 extending from the base portion 144.

Although only one air diverter member 140, one skilled in the art will recognize that with each additional disc 110 (of FIG. 1) added to the head-disc assembly 106 (of FIG. 1), the overall height of the air diverter 132 is increased proportionally and a corresponding additional air diverter member 140 is provided to mitigate turbulent airflow between disc pairs.

Figure 8:
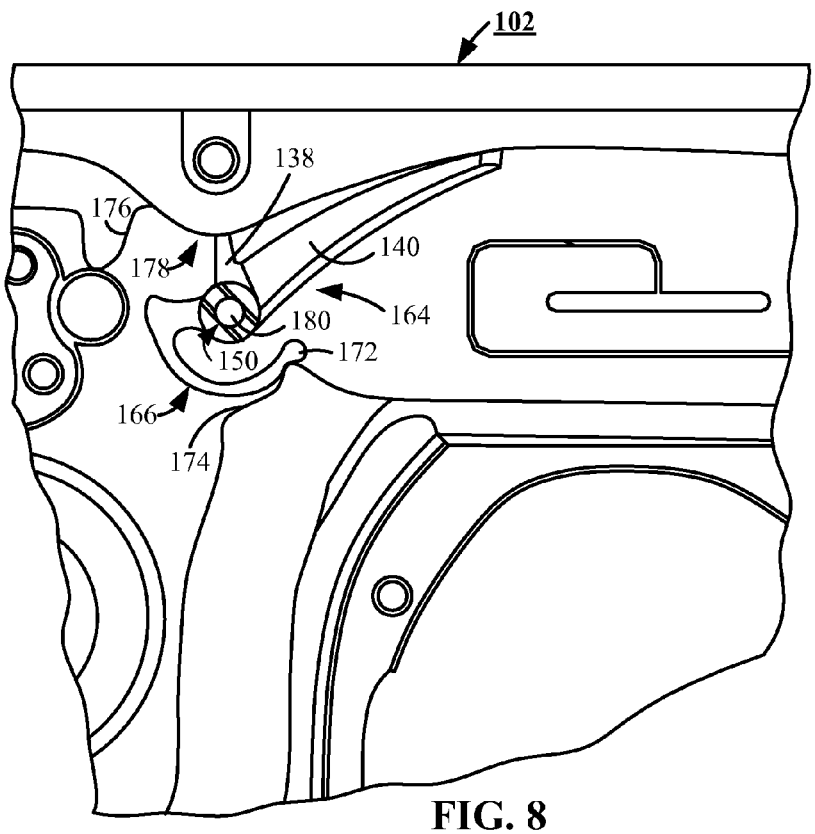
FIG. 8 is a partial cutaway top plan view of a combination that includes an alternate embodiment of the base deck of FIG. 1 and the air diverter of FIG. 6.
Figure 9:
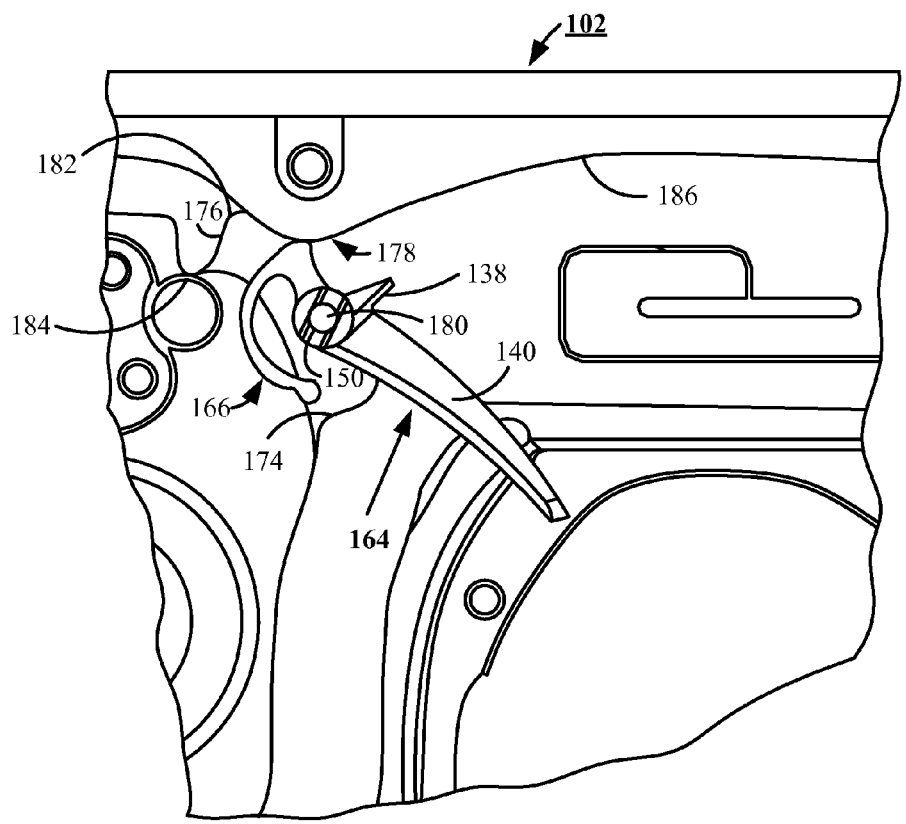
FIG. 9 is a partial cutaway top plan view of the combination of FIG. 8, showing the air diverter in an operating position.
Figure 10:
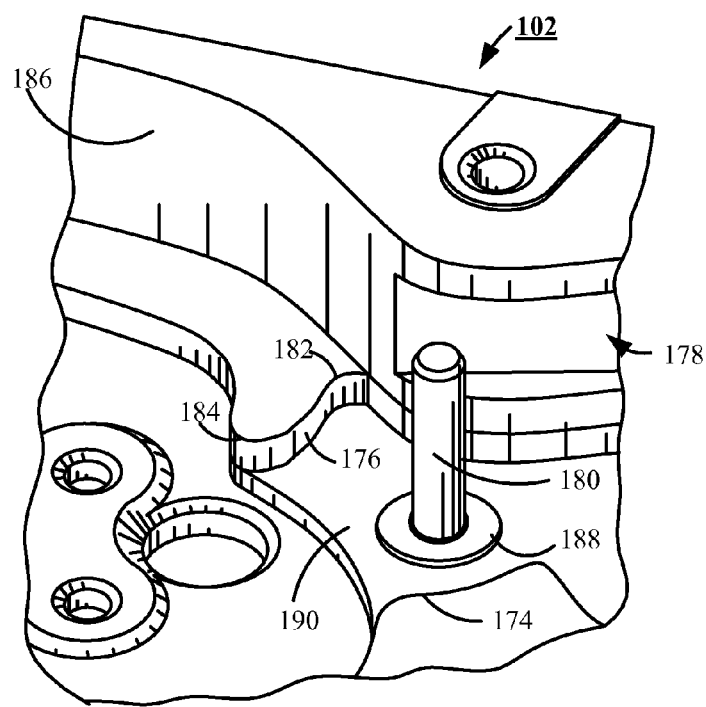
FIG. 10 is a partial cutaway perspective view of the base deck of the combination of FIG. 8.

As will be covered in greater detail during a subsequent discussion of FIGS. 8, 9 and 10, the spring portion 146 includes a cam follower 148 on a distal end of the spring portion 146 that mates to a cam surface (not shown) in the base deck 102 of FIG. 1.

The cam follower 148 interacts with the cam surface to maintain the air diverter 132 in one of two stable, radial positions. Those positions are either the shipping position or the operating position, hence the use herein of the term bi-stable configuration in reference to the air diverter 132. A more detailed discussion of the operative interaction between the cam follower 148 and the cam surface is provided during the subsequent discussion of FIG. 9.

The air diverter 132 is confined in a lateral direction by a mounting aperture 150 communicating with a mounting pin (not shown) of the base deck 102, and the constraint member 138 is disposed within a constraint channel (not shown) of the base deck 102 when the air diverter 132 is placed in a shipping position. The disc snubber member 142 is an optional feature, and may be absent from the air diverter without effecting the operating performance of the air diverter member 140. Additionally, it will be noted that for the bi-stable configuration embodiment of the air diverter 132, the cam follower 148 and the constraint member 138 lie on a common side of the mounting aperture 150.

It is noted however, that the geometric relationships between the retention member 134, the constraint member 138, the air diverter member 140, the disc snubber member 142 and a tooling slot (shown in FIG. 3 at 158) are design choices related to the particular configuration of the DSD incorporating the air diverter 132 and do not impact the functionality of the air diverter 132.

Figure 3:
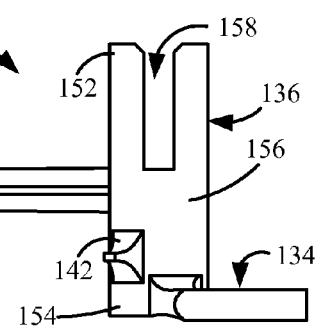
FIG. 3 is an elevational view of the air diverter of FIG. 2.

FIG. 3 shows an upper portion 152 of the main body 136, a lower portion 154 and a mid portion 156 between the upper and lower portions, 152 and 154. A tooling slot 158 is provided for use in rotating the air diverter member 140 into either a shipping position or an operating position. The tooling slot 158 commences at the upper portion 152 and extends to the mid portion 156.

Figure 4:
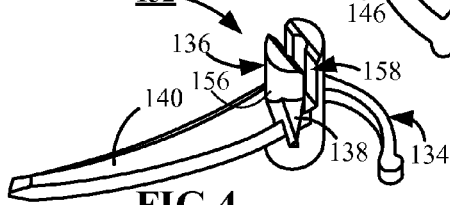
FIG. 4 is a top perspective view of the air diverter of FIG. 3.

FIG. 4 shows the constraint member 138 adjacent the tooling slot 158 and extending from the mid portion 156 of the main body 136 in a direction that mitigates interference with use of a slot tool (not shown), which communicates with the tooling slot 158 during rotation of the air diverter 132 into and out of the shipping position.

Figure 5:
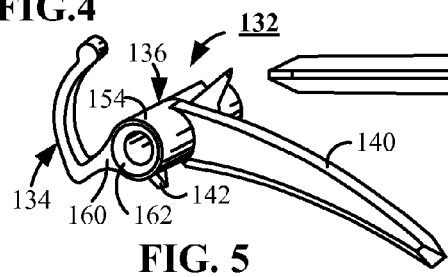
FIG. 5 is a bottom perspective view of the air diverter of FIG. 4.

FIG. 5, in conjunction with FIG. 3, shows the retention member 134 shares a common surface 160 with the lower portion 154 of the main body 136 of the air diverter 132. Additionally, FIG. 5 shows a recess 162 that communicates with a mounting pin bushing (shown at 188 of FIG. 10) to maintain sliding support of the air diverter 132 while slightly elevating the common surface 160 during rotation of the air diverter 132 into and out of the shipping position.

Figure 6:
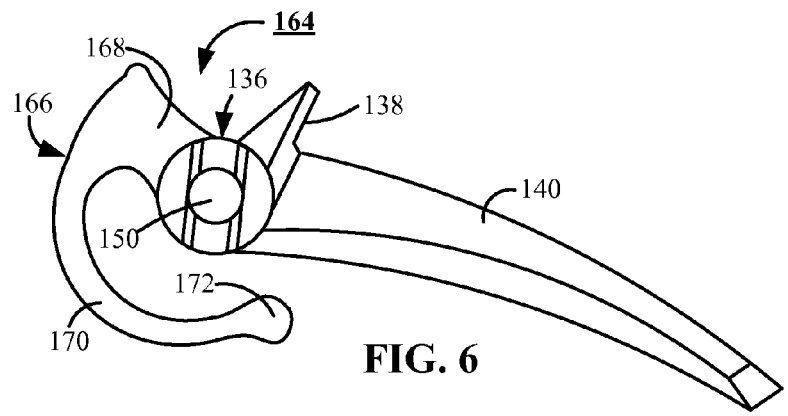
FIG. 6 is a top plan view of an alternate embodiment of the air diverter of FIG. 1.

FIG. 6 shows an alternate preferred embodiment of a single acting air diverter 164. Members and portions of the air diverter 164 that share a common structure, function and positional location to members and portions of air diverter 132 (of FIG. 1) are identified by common sign numbers. The single acting air diverter 164 includes a retention member 166 extending in a first direction from the main body 136. The constraint member 138 extending in a second direction from the main body 136, and the air diverter member 140 extending in a third direction from the main body 136. The retention member 166 includes a base portion 168 adjacent the main body 136 and a spring portion 170 extending from the base portion 168.

As will be covered in greater detail during the subsequent discussion of FIGS. 8, 9 and 10, the spring portion 170 includes a cam follower 172 on a distal end of the spring portion 170, which mates to a cam surface (not shown) in the base deck 102 (of FIG. 1). The air diverter is confined in a lateral direction by a mounting aperture 150 communicating with a mounting pin (not shown) of the base deck 102. The constraint member 138 constrains motion in a vertical direction, when in a shipping position. That is, when the constraint member 138 is disposed within a constraint channel (not shown) of the base deck 102.

Additionally, it will be noted that for the configuration embodiment of the single acting air diverter 164, the cam follower 172 and the constraint member 138 lie on opposite sides of the mounting aperture 150, with a central lateral plane of the constraint member 138 lying substantially parallel to a central lateral plane of the air diverter member 140.

Figure 7:
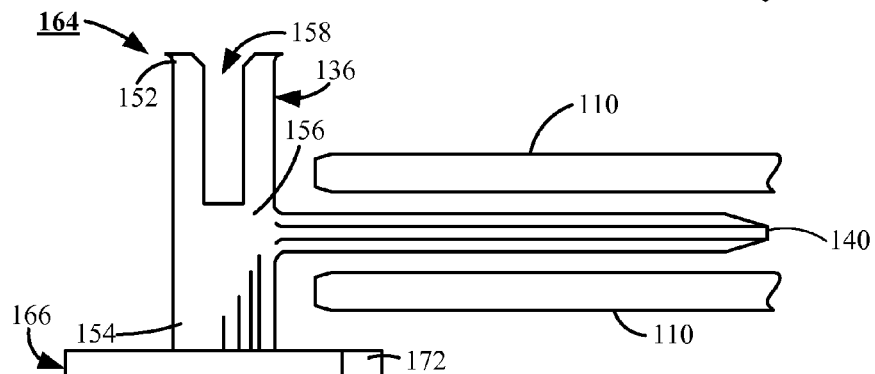
FIG. 7 is an elevational view of the air diverter of FIG. 6.

FIG. 7 shows an upper portion 152 of the main body 136, a lower portion 154 and a mid portion 156 between the upper and lower portions, 152 and 154. A tooling slot 158 is provided for use in rotating the air diverter member 140 into either a shipping position or an operating position. The tooling slot 158 commences at the upper portion 152 and extends to the mid portion 156. FIG. 7 also shows the air diverter member 140 extending from the mid portion 156 of the main body 136, while the retention member 166 extends from the lower portion 154 of the main body 136, and occupies a plurality of planes substantially parallel to a plurality of planes occupied by the air diverter member 140. Also shown by FIG. 7, is the relationship between the disc 110 and the air diverter 132, when the air diverter 132 has been placed in its operating position.

FIG. 8 shows the base deck 102 in combination with the single acting air diverter 164. The single acting air diverter 164 is shown in the shipping position. The cam follower 172 of the retention member 166 is in sliding communication with a cam surface 174 of the base deck 102. FIG. 8 further shows the constraint member 138 engaging a constraint channel 178. Engagement of the constraint member 138 (of either the single acting air diverter 164 or the bi-stable configuration of the air diverter 132) within the constraint channel 178 constrains movement of either diverter, 132 or 164, in the vertical direction, while a mounting pin 180 in sliding communication with the mounting aperture 150 constrains movement in the lateral direction. It is noted that no mounting hardware is directly involved with the installation of the air diverter, 132 or 164, into the head-disc assembly 106, nor is any needed for maintaining the air diverter, 132 or 136, in the operating position. It is further noted that the air diverter, 132 or 136, may be utilized in conjunction with any downstream air dams or shrouds present in the DSD incorporating the air diverter, 132 or 136.

FIG. 9 shows an alternate cam surface 176 of the base deck 102, which is provided for use with the bi-stable configuration of the air diverter 132 (of FIG. 2). The cam follower 148 (of FIG. 2) interfaces with a cam surface detent 182 to restrain the bi-stable air diverter 132 in an operating position. Installation of the cover 104 (of FIG. 1) aids in maintaining the bi-stable in the operating mode, but the spring force developed between the cam surface detent 182 and the cam follower 148 retains the bi-stable air diverter 132 in the operating position.

However, for the single acting air diverter 164, a combination of frictional force developed between the mounting aperture 150 and the mounting pin 180, in conjunction with a compressive load imparted on the single acting air diverter 164 during installation of the top cover 104, the single acting air diverter 164 is retained in the operating position.

To maintain the air diverter in a shipping position, the cam follower 148 interfaces with a cam lobe 184. With the cam follower 148 adjacent the lobe 184, a spring force is developed in the spring portion 146 of the air diverter 132, which encourages the air diverter member 140 adjacent a side wall 186 of the base deck 102 and places the constraint member 138 into communication with the constraint channel 178.

FIG. 10 provides a better perspective of the constraint channel 178 and the special relationship between the constraint channel 178 and the mounting pin 180. Also shown by FIG. 10, a mounting pin bushing 188 provides sliding support of the recess 162 (of FIG. 5) and a slight elevation of the common surface 160 (of FIG. 5) for passing clearance between the common surface 160 and a base 190 of the base deck 102 during rotation of the air diverter member 140 between the shipping position and the operating position.

Figure 11:
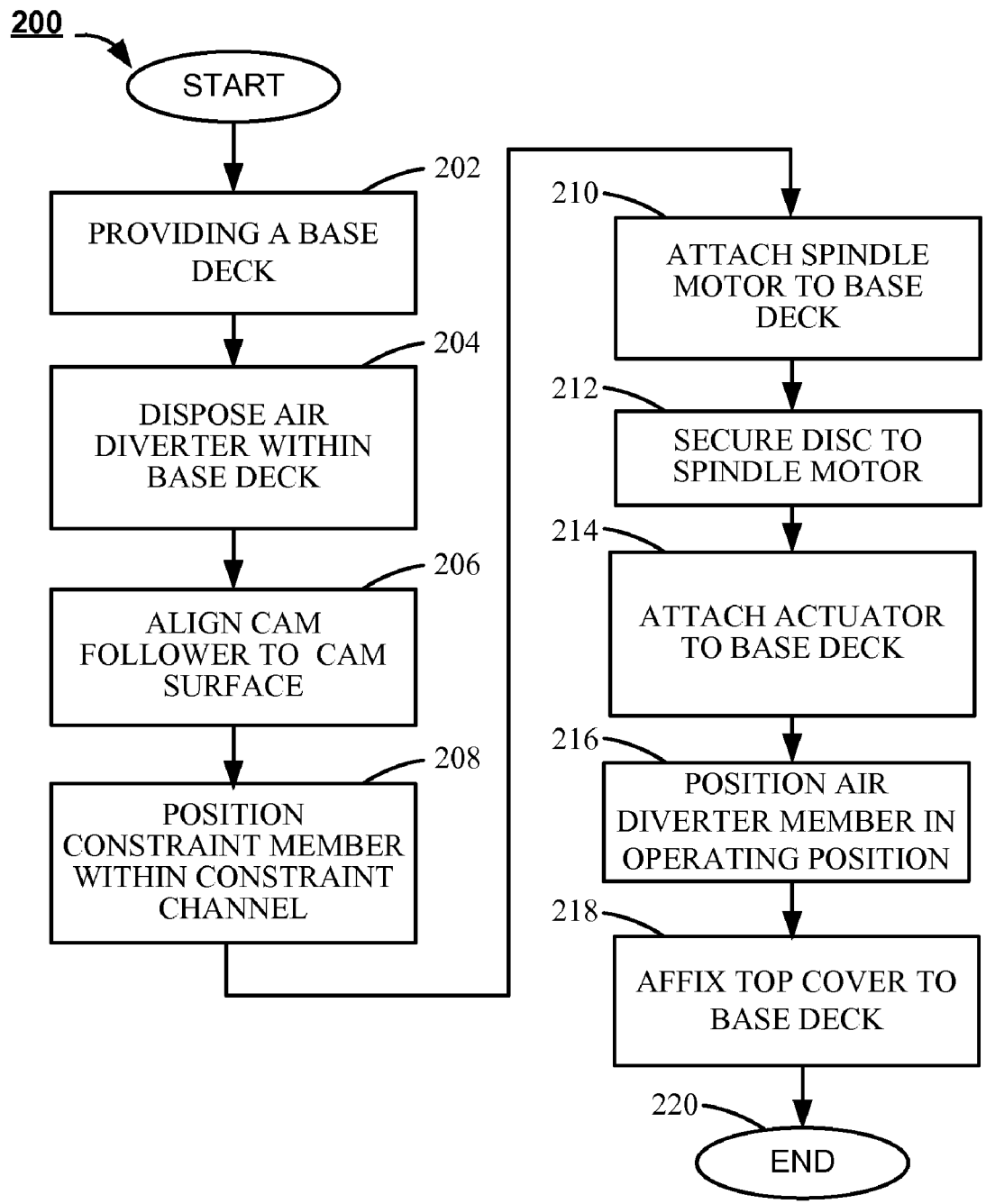
FIG. 11 is a flow chart of a method for securing the air diverter of FIG. 9 in the operating position.

FIG. 11 shows a DSD assembly process beginning at start step 200 and continuing at process step 202. At process step 202, a base deck (such as 102) is provided for receipt of an air diverter (such as 132,164), which is disposed within the base deck at process step 204. At process step 206, a cam follower (such as 148, 172) is aligned to a cam surface (such as 174, 176), and at process step 208 a constraint member (such as 138) is positioned relative to a constraint channel (such as 178) to maintain the air diverter in a shipping position.

At process step 210, a spindle motor assembly (such as 108) is secured to the base deck, while at process step 212 a disc (such as 110) is attached to the spindle motor assembly. At process step 214, an actuator (such as 112) supporting a read/write head (such as 114) is fastened to the base deck 102 and the head is positioned into a data exchange relationship with the disc 110. At process step 216, the air diverter is repositioned from the shipping position into an operating position to mitigate turbulent air flow across the actuator during operation of a DSD (such as 100).

At process step 218, a top cover (such as 104) is positioned in mating contact with the base deck and the air diverter. Upon securing the top cover to the base deck, the air diverter is maintained in the operating position by a compressive load developed between the top cover and the base deck, which results from securing the top cover to the base deck. The DSD assembly process 200 concludes at end process step 220.

Accordingly, embodiments of the present invention are generally directed to a method (such as 200, as described hereinabove) and combination which includes a base deck (such as 102), that has a retention cam surface (such as 174, 176) adjacent a mounting pin (such as 180), and an air diverter (such as 132, 164) joined to the base deck. The air diverter is placed in an operating position by executing the process steps of the method.

The combination further includes a spindle motor assembly (such as 108) attached to the base deck, a disc (such as 110) secured to the spindle motor assembly, and an actuator (such as 112) affixed to the base deck. The actuator includes a read/write head (such as 114) that is positioned in a data exchange relationship with the disc. A top cover (such as 104) is affixed to the base deck, which confines the air diverter in an operating position adjacent the disc and up stream of the read/write head, i.e., positioned such that air currents developed by rotation of the disc during operation of the DSD are encountered by the air diverter prior to engaging the head. The air diverter mitigates turbulent air flow of the air currents prior to the air currents encountering the read/write head.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A disc drive comprising:
   a base deck comprising a base, wherein the base comprises a mounting pin;
   a side wall generally normal to the base, wherein the side wall comprises a generally curved region with a lobe adjacent to the mounting pin; and wherein the base further comprises a cam lobe adjacent the mounting pin and the lobe in the side wall, and a cam surface detent between the cam lobe and the side wall;
   an air diverter comprising
      a main body comprising a mounting aperture communicating with the mounting pin;
      a retention member extending in a first direction from the main body, wherein the retention member comprises a base portion adjacent the main body and a spring portion extending from the base portion, wherein the spring portion comprises a cam follower;

a constraint member extending in a second direction from the main body, wherein the cam follower and the constraint member are on the same side of the main body; and an air diverter member extending in a third direction from the main body;

wherein the cam follower on the air diverter engages the cam lobe when the air diverter is in a first radial position, and wherein the cam follower on the air diverter engages the cam surface detent when the air diverter is in a second radial position different from the first radial position.

2. The disc drive of claim 1, wherein the side wall further comprises a constraint channel in the lobe in the side wall, and wherein the constraint member engages the constraint channel when the air diverter is in the first radial position.

3. The disc drive of claim 1, wherein the air diverter member and the constraint member extend in a first plane from a first portion of the main body of the air diverter, and the retention member extends in a second plane from a second portion of the main body different from the first portion, and wherein the second plane is adjacent to the base of the base deck.

4. The disc drive of claim 1, further comprising a bushing on the mounting pin, wherein the bushing is between the main body of the air diverter and the base of the base deck.

5. The disc drive of claim 1, further comprising:
a spindle motor assembly attached to the base deck;
at least one disc secured to the spindle motor assembly;
an actuator fixed to the base deck, the actuator having a read/write head; and
a top cover affixed to the base deck, wherein the top cover confines the air diverter in an operating position adjacent the disc and up stream of the read/write head.

6. The disc drive of claim 5, wherein the disc drive comprises at least two discs, and wherein the air diverter is between the at least two discs.

7. The disc drive of claim 1, wherein the air diverter further comprises a disc snubber member on a side of the main body opposite the constraint member.

* * * * *